US012321393B2

(12) United States Patent
Thomas et al.

(10) Patent No.: US 12,321,393 B2
(45) Date of Patent: Jun. 3, 2025

(54) LLM INTEGRATIONS FOR DATA VISUALIZATION IN SPREADSHEET ENVIRONMENTS

(71) Applicant: Microsoft Technology Licensing, LLC, Redmond, WA (US)

(72) Inventors: Johnnie C. Thomas, Seattle, WA (US); Vipul Garg, Kirkland, WA (US); Javier Ricardo Escobar Avila, Redmond, WA (US); Xiaomei Wang, Sammamish, WA (US); Auston Robert Wallace, Seattle, WA (US); Christopher Evan Oslund, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/318,904

(22) Filed: May 17, 2023

(65) Prior Publication Data
US 2024/0386058 A1 Nov. 21, 2024

(51) Int. Cl.
*G06F 16/9032* (2019.01)
*G06F 16/28* (2019.01)
*G06F 40/20* (2020.01)

(52) U.S. Cl.
CPC ...... *G06F 16/90332* (2019.01); *G06F 16/287* (2019.01); *G06F 40/20* (2020.01)

(58) Field of Classification Search
CPC .. G06F 16/90332; G06F 16/287; G06F 40/20; G06F 40/186; G06F 16/243;
(Continued)

(56) References Cited

U.S. PATENT DOCUMENTS 11,769,017 B1 * 9/2023 Gray ................... G06N 3/0455
    704/9
11,861,263 B1 * 1/2024 Hunt ..................... G06F 3/0481
(Continued)

OTHER PUBLICATIONS

Ragavan et. al. 2022. GridBook: Natural Language Formulas for the Spreadsheet Grid. In Proceedings of the 27th International Conference on Intelligent User Interfaces (IUI '22). Association for Computing Machinery, New York, NY, USA, 345-368. https://doi.org/10.1145/3490099.3511161 (Year: 2022).*

(Continued)

*Primary Examiner* — Michael Pham

(57) ABSTRACT

Technology is disclosed herein for the integration of spreadsheet environments with an LLM service. In an implementation, an application receives a natural language input from a user associated with visualization of data hosted by the application. The application generates a prompt for a large language model (LLM) service based on the user input and the visualization and submits the prompt to the LLM service. The application receives a reply to the prompt from the LLM service and modifies the visualization based on the reply from the LLM service. In an implementation, the data includes spreadsheet data and the visualization includes a chart. In some implementations, to modify the visualization, the application generates source code based on the reply from the LLM service when the classification of the natural language input is a command.

20 Claims, 11 Drawing Sheets

(58) Field of Classification Search
CPC .... G06F 16/3329; G06F 40/103; G06F 40/18;
G06F 16/33295
USPC ......................................................... 707/706
See application file for complete search history.

(56) References Cited

U.S. PATENT DOCUMENTS

| | | | | |
|---|---|---|---|---|
| 2020/0034481 | A1* | 1/2020 | Asplund | G06F 16/35 |
| 2020/0293167 | A1* | 9/2020 | Blyumen | G06F 16/904 |
| 2023/0259705 | A1* | 8/2023 | Tunstall-Pedoe | G06N 5/01 |
| | | | | 704/9 |
| 2024/0338232 | A1* | 10/2024 | Copes | G06F 9/451 |
| 2024/0362405 | A1* | 10/2024 | Sultanum | G06F 40/166 |

OTHER PUBLICATIONS

Anonymous, "Holy Google Sheets! You Can Now Integrate the ChatGPT API", Retrieved from the URL: https://ai.plainenglish.io/holy-google-sheets-you-can-now-integrate-the-chatgptapi-b401ac065844, Mar. 8, 2023, 7 Pages.

International Search Report and Written Opinion received for PCT Application No. PCT/US2024/026705, Jul. 29, 2024, 17 pages.

Sarkar, et al., "What is it like to program with artificial intelligence?," In Repository of arXiv:2208.06213v1, Aug. 12, 2022, 26 Pages.

* cited by examiner

LLM INTEGRATIONS FOR DATA VISUALIZATION IN SPREADSHEET ENVIRONMENTS

TECHNICAL FIELD

Aspects of the disclosure are related to the field of productivity applications and large language models and, in particular, to integrations there between.

BACKGROUND

Spreadsheet applications, such as Microsoft Excel®, as well as other applications capable of handling tabular data, are widely used for data analysis, data organization and management, and computational tasks involving quantitative as well as qualitative data. Given the broad range of functions and capabilities available in spreadsheet applications, special-purpose artificial intelligence (AI) models have been developed to aid users in figuring out how to accomplish particular tasks. These AI models, such as Microsoft Excel®'s Insights engine, are trained on a vast quantity of spreadsheet data which enables them to identify patterns and generate insights into datasets. However, because the scope of the training is based entirely on spreadsheet data, this constrains the utility of these models to the domain of spreadsheet data and spreadsheet functionalities.

In more recent advances in AI technology, large language models (LLMs), which are a general-purpose type of AI model, have been developed which are capable of natural language communication. Transformer models are a type of AI model used in natural language processing that are designed to process sequences of words, such as sentences or paragraphs. LLMs such as Generative Pretrained Transformer (GPT) models and Bidirectional Encoder Representations from Transformer (BERT) models have been pre-trained on an immense amount of data across virtually every domain of the arts and sciences and have demonstrated the capability of generating responses which are novel, open-ended, and unpredictable.

However, harnessing this capability comes at a cost: LLM integration can introduce latency which negatively impacts the user experience; LLMs require a tremendous amount of compute power to function; and LLMs are known to hallucinate—that is, to imagine information which does not actually exist. Moreover, given the diverse subject matter in the training data used to train LLMs, LLMs may generate a response to an inquiry which diverges so far from what the user is asking that the response ends up being useless.

OVERVIEW

Technology is disclosed herein for the integration of spreadsheet environments with LLM services. In an implementation, an application receives a natural language input from a user associated with a visualization of data hosted by the application. The application generates a prompt for a large language model (LLM) service based on the user input and the visualization and submits the prompt to the LLM service. The application receives a reply to the prompt from the LLM service and modifies the visualization based on the reply from the LLM service.

In an implementation, the data includes values in a spreadsheet, the visualization includes a chart, and the prompt tasks the LLM service with determining a classification of the natural language input and including the classification in the reply. In some implementations, to modify the visualization, the application generates source code based on the reply from the LLM service when the classification of the natural language input is a command.

In an implementation, the prompt tasks the LLM service with formatting the reply as a JavaScript Object Notation (JSON) data object. In the same or other implementations, to generate the prompt, the application includes a JSON data object representation of the visualization in the prompt.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
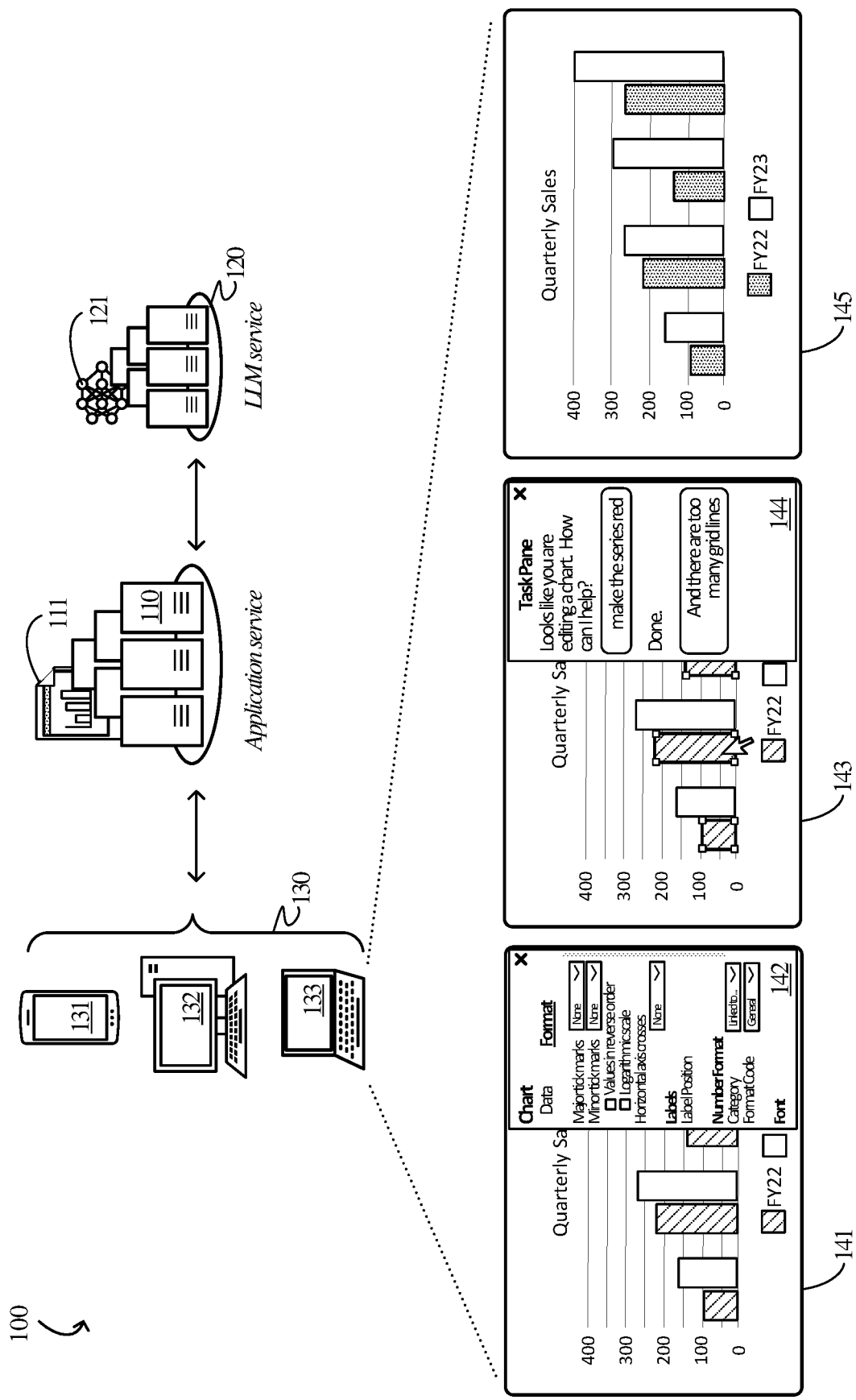
FIG. 1 illustrates an operational environment of an LLM integration for data visualization in a spreadsheet environment in an implementation.

Various implementations are disclosed herein for LLM integrations for visualizations of data in spreadsheet and other application environments. An application, implemented in software on one or more computing devices, receives a natural language (NL) input from a user in the context of a spreadsheet or other application environment capable of hosting data and generates a prompt based on the natural language input and a visualization of data, such as a chart associated with spreadsheet data. The application submits the prompt to a large language model (LLM) service (or "LLM") and receives a reply from the LLM. The reply from the LLM received by the application is in a parse-able format and includes information for modifying the visualization, such as a new value for a property of the visualization. The application generates source code based on the reply from the LLM and executes the code to modify the visualization. In various implementations, applications comprising LLM integrations for data visualization include spreadsheet applications as well as non-spreadsheet applications, such as word processing applications, presentation applications, and the other productivity applications, and other applications capable of hosting tabular data and generating visualizations of the data.

Transformer models, of which LLMs are a type, are a class of deep learning models used in natural language processing (NLP) based on a neural network architecture which use self-attention mechanisms to process input data and capture contextual relationships between words in a sentence or text passage. Transformer models weigh the importance of different words in a sequence, allowing them to capture long-range dependencies and relationships between words. GPT, BERT, ERNIE (Enhanced Representation through kNowledge Integration), T5 (Text-to-Text Transfer Transformer), and XLNet models are types of transformer models which have been pretrained on large amounts of text data using a self-supervised learning techniques such as masked language modeling. This pretraining allows the models to learn a rich representation of language that can be fine-tuned for specific NLP tasks, such as text generation or completion, chat completion, text classification, language translation, or sentiment analysis.

In various implementations of LLM integrations for data visualization in various application environments, the user-supplied natural language input includes text which expresses a request or desire to modify a chart based on tabular data in a spreadsheet or other document, and the reply from the LLM includes output which, when implemented as chart commands or source code, effects the desired modification. For example, the input may request to change the symbols used on a scatter plot. The LLM replies with a data object, such as JSON data object, which includes the chart property associated with scatter plot symbols and the new property value corresponding to the desired result. The application receives the reply from the LLM and configures source code based on the data object. The application submits the source code to an execution queue, and when the source code is executed, the visualization is updated according to the reply. In some implementations, the reply from the LLM includes a clarifying question when the LLM detects ambiguity in the natural language input. From the preceding example, if the scatter plot includes multiple data series, the LLM may return a query to the application to determine which data series should be modified or if all of the data series are to be modified. The application displays the clarifying question in the user interface and generates a follow-up prompt based on the user's response.

As used herein, the term "visualization" refers to a graphical representation or visualization of data such as a pie chart, column chart, bar graph, scatter plot, line graph, histogram, map chart (e.g., a heat map), infographic, and other chart types, as well as to a three-dimensional chart or a combination of charts or other visualizations. Data of a data visualization can include tabular data (e.g., spreadsheet data or table data). Properties of visualizations include—but are not limited to—design or format properties (e.g., style, size, color, visibility, border, fill, etc.) of elements of a visualization (e.g., chart title, chart type, chart axes, chart area, tick marks, legend, etc.). Properties of data visualizations can also include the data source, such as tabular data within the application environment or data imported from an external source.

In some scenarios, the prompt generated by the application includes tasks or rules, contextual information associated with the application environment, e.g., spreadsheet environment, and the user's natural language input. The rules may direct the LLM to configure its output in a parse-able format, such as a JSON object or in semantic tags. From the parse-able output received from the LLM, the application extracts the information corresponding to the suggested modification and creates executable commands or source code for implementing the modification in the spreadsheet. The LLM may also be instructed, in the prompt, to generate its output as source code which can be executed without further processing, such as Office JavaScript API source code. In an implementation, the source code generated or translated from the reply (e.g., from a JSON object in the reply) is in the same language (e.g., JavaScript) or uses the same syntax as a command which would be executed if the user had manually changed the property in a chart menu or task pane in the application environment. Thus, the user can implement a modification to a chart via a natural language input which would be equivalent to the user manually changing a chart property in a task pane in the user interface or to the user navigating through a menu system of the application environment to find the chart property and change it.

Other rules provided by the prompt may instruct the LLM to constrain its reply to the chart properties of the particular application, such as those for Microsoft Excel® charts. The rules may also direct the LLM to be aware of synonyms to chart properties (e.g., defined terms of other applications) and misspellings of chart properties in the user input (or even a misspelling of a synonym), for example, equating a "foreign" term in the input to a defined property of the chart.

In other non-limiting implementations, the prompt tasks or rules includes one or more illustrative examples to guide or coach the LLM in generating or formatting its output. The illustrative example may include the syntax by which to provide a suggestion from the LLM based on the input, where the suggestion includes a chart property and a new or updated value of the property. An illustrative example may be a static example, i.e., unchanging with respect to a particular input or chart, or the illustrative example may be a dynamic example which is configured by the application according to the chart or the input. The illustrative example may include a format for providing multiple suggestions based on a single user input, such as when request implicates a modification of two or more chart properties and new or updated values for those properties. A prompt rule may also task the LLM with selecting the single most likely property of the property tree when the LLM determines that multiple properties are implicated.

Because the natural language input provided by a user is freeform and unconstrained, in various implementations, the LLM is tasked by the prompt to classify the input as a search, a command, feedback, a search for help, a request for a recommendation, ambiguous, requiring clarification, and so on. According to a prompt rule, if the LLM classifies the input as a command, the LLM then determines which chart properties are implicated and new values for the properties. If the user asks, "what's the right chart for my data," the LLM may classify the input as a search for help or a request for a recommendation and return a reply which indicates the classification along with a suggestion for accommodating the user's request, such as a help article of the application or a recommendation to use a chart design engine of the application or a fine-tuned AI model of the application. In some scenarios, the LLM may reply with a recommended chart type based on contextual data in the prompt that includes at least a portion of the spreadsheet data.

In an implementation, the application includes in the prompt a representation of the chart to which the user input refers. The format of the representation is a data structure which includes chart design and format properties which define the chart. The chart properties may be organized in a hierarchical fashion, such as a property tree. For example, the chart title may be a property which includes multiple categories, such as the font, location, visibility, text box formatting, and so on. The font of the chart title may include multiple categories such as the font name, size, style, word art effects (e.g., shadow, reflection, etc.), and so on. The data structure which defines a chart may be a JSON data object including property identifiers, values, descriptions, names, and so on.

In various implementations, the application provides contextual information or context in the prompt, such as indicating that the user input refers to a chart and a text description of the chart which includes details about the chart. In configuring the prompt, the application may also include contextual information such as document metadata (e.g., filename), information relating to the workbook where the chart is located, a number of charts in the spreadsheet or other document, column header information, number of data rows, etc. Contextual information may also include the user's preceding inputs and corresponding replies from the LLM. The application may also provide context by which the LLM can classify the input, such as an indication of the spreadsheet component (e.g., a chart in the spreadsheet) which is currently selected by the user or in focus or which was most recently acted upon by the user.

In some implementations, the user's natural language input includes text which expresses a request to modify a chart of the spreadsheet or other document in a specific way or a desired outcome without expressly requesting a modification. The reply from the LLM includes information or instructions for modifying the spreadsheet according to the request. Based on the reply (in which the LLM recognizes the input to include a command), the application may generate and display a preview of the modification indicated in the reply along with a graphical device (e.g., button) by which the user can adopt the modification.

In some scenarios, the application displays in the user interface of the application a task pane or a chat interface by which the application can receive user-supplied natural language inputs and display responses to the inputs based on the replies generated by the LLM. As more inputs are received, the chat history adds to the contextual information that is used by the LLM to provide more accurate results, i.e., results which are increasingly responsive to the user's inquiries during the conversation. As the LLM is presented with more context, the results (i.e., suggestions) generated by the LLM will be more responsive to the user's inquiries. For example, where the user may issue a series of inputs with regard to modifying a chart in stages, such as changing the fonts of the chart text (i.e., title, labels, legend, etc.), then changing the font size or style for individual text elements of the chart, and so on.

Technical effects which may be appreciated from the technology disclosed herein include simplified software development in that LLM integration reduces the need for developing complex deterministic coding for responding to the user inputs which can refer to any of a vast number of chart modification options and which may include imprecise language, incorrect terms, synonyms, misspellings, and so on. Technical effects also include streamlined user interaction which implements modifications to charts without the user having to navigate through multiple command ribbons, drop-down menus, contextual menus, and other graphical devices, without presenting the user with a potentially confusing array of similarly sounding choices to perform the action the user is looking for, and circumventing the user having to modify his/her chart through trial-and-error. Further, a single user input can instigate multiple modifications to the chart rather than the user having to perform each action or modification individually. Moreover, the application tailors the prompt such that the LLM will produce its reply optimally in terms of latency, utility, coherence, and so on.

Other technical advantages may be appreciated from the disclosed technology. Prompts tailored according to the disclosed technology reduce the amount of data traffic between the application service and the LLM for generating useful information for the user. For example, the disclosed technology streamlines the interaction between the user and the application service by keeping the LLM on task and reducing the incidence of erroneous, inappropriate, or off-target replies. The disclosed technology also promotes more rapid convergence, that is, reducing the number of interactions with the LLM to generate a desired result.

In addition, the disclosed technology focuses the generative activity of the LLM to improve the performance of the LLM without overwhelming the LLM (e.g., by exceeding the token limit). For example, the disclosed technology balances prompt size (e.g., the number of tokens in the prompt which must be processed by the LLM) with providing sufficient information to generate a useful response. Other technical benefits accruing from streamlined interaction, more rapid convergence, and optimized prompt sizing include reduced data traffic, faster performance by the LLM, reduced latency, and concomitant improvements to productivity costs and to the user experience.

Turning now to the Figures, FIG. 1 illustrates operational environment 100 in an implementation. Operational environment 100 includes application service 110, LLM service 120, and computing devices 130. Application service 110 hosts an application, such as a spreadsheet application (e.g., Microsoft Excel®), to endpoints such as computing devices 130 which execute applications that provide a local user experience and that interface with application service 110. Application service 110 hosts an environment in the local user experience which includes chart data 111 which is representative of data associated with charts and other types of data visualizations. The applications running locally with respect to computing devices 130 may be natively installed and executed applications, browser-based applications, mobile applications, streamed applications, or any other type of application capable of interfacing with application service 110 and providing a user experience, such as the user experiences 141, 143, and 145. The environment of application service 110 may be implemented as a natively installed and executed application, a browser-based application, or a mobile application, and may execute in a stand-alone manner, within the context of another application such as a presentation application or word processing application, with a spreadsheet functionality, or in some other manner entirely. LLM service 120 hosts LLM 121 which is representative of a generative pretrained transformer (GPT) computing architecture such as GPT-3®, GPT-3.5, ChatGPT®, or GPT-4.

Figure 7:
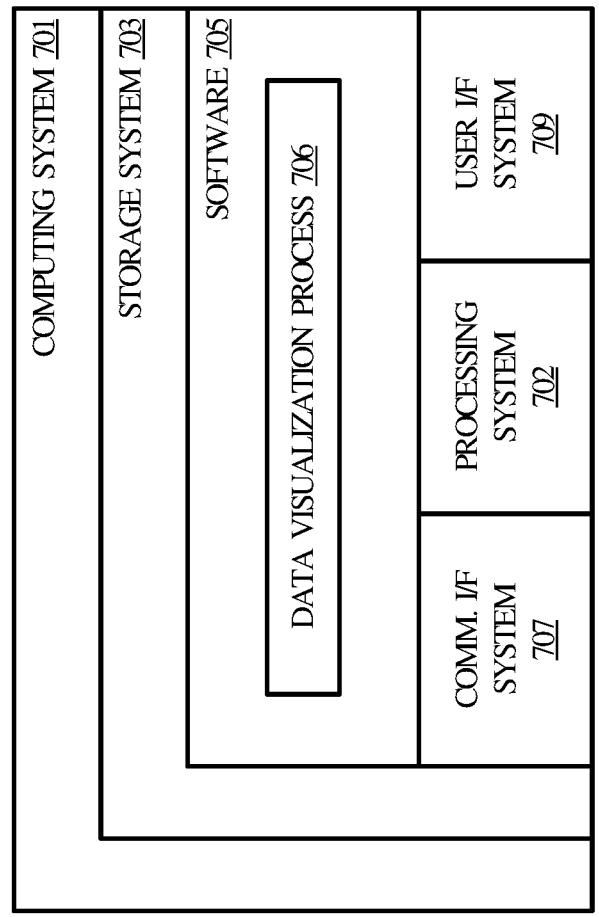
FIG. 7 illustrates a computing system suitable for implementing the various operational environments, architectures, processes, scenarios, and sequences discussed below with respect to the other Figures.

Computing devices 130, including computing devices 131, 132, and 133, are representative of computing devices, such as laptops or desktop computers, or mobile computing devices, such as tablet computers or cellular phones, of which computing device 701 in FIG. 7 is broadly representative. Computing devices 130 communicate with application service 110 via one or more internets and intranets, the Internet, wired or wireless networks, local area networks (LANs), wide area networks (WANs), and any other type of network or combination thereof. A user interacts with the productivity application of application service 110 via a user interface of the application displayed on any of computing devices 130. User experiences 141, 143, and 145, including chart menu 142 and task pane 144, are representative of user experiences of a spreadsheet environment of a productivity application hosted by application service 110 in an implementation.

Application service 110 is representative of one or more computing services capable of hosting an application, such as a spreadsheet application or other productivity application, and interfacing with computing devices 130 and with LLM service 120. Application service 110 may be implemented in software in the context of one or more server computers co-located or distributed across one or more data centers.

LLM service 120 is representative of one or more computing services capable of hosting LLM 121, an LLM computing architecture, and communicating with application service 110. LLM service 120 may be implemented in the context of one or more server computers co-located or distributed across one or more data centers. LLM 121 is representative of a deep learning AI transformer model, such as ChatGPT®, BERT, ERNIE, T5, XLNet, and the like, which is integrated with the spreadsheet environment associated with application service 110.

In operation, the user of computing device 133 interacts with application service 110 via a user interface, examples of which are illustrated in user experiences 141, 143, and 145. In user experience 141, the user seeks to modify a chart of a spreadsheet in a spreadsheet environment of application service 120. As illustrated in operational environment 100, property settings for the chart are presented to the user in chart menu 142 which may be surfaced in user experience 141 in response to the user making a selection to view the chart properties from an application menu, right-clicking the chart, or by other user input.

Rather than modifying a chart property in chart menu 142, the user, perhaps unfamiliar with the various properties presented in chart menu 142 or not seeing the desired property in chart menu 142, enters a natural language input relating to what the user wishes to accomplish in task pane 144. Task pane 144 may be presented to the user based on the user's menu selection, in response to user input in a floating suggestion box in the spreadsheet environment, or other user input. In user experience 143, application service 120 displays a message to initiate a dialog or conversation with the user for assisting the user in editing the chart. In response to the message, the user enters a natural language input in task pane 144 by keying in a text entry which expresses the user's interest or question: "make the series red." Application service 110 creates a prompt based on the user's statement along with contextual information of the chart indicating that the FY22 data series is currently selected. Application service 110 submits the prompt to LLM service 120. LLM service 120 determines that the user input is a command, generates a reply responsive to the command, and sends the reply to application service 110.

Application service 110 parses the reply to generate source code which, when executed, modifies the chart (making the selected data series red) according to the user input. In some scenarios, the prompt may task LLM service 120 with generating a response irrespective of ambiguity in the input—such as modifying the first data series of the chart or all the data series of the chart when it is unclear which data series was meant. In other scenarios, LLM service 120 may classify the user input as ambiguous and return a reply which causes application service 110 to generate a message to the user. For example, LLM service 120 may respond to an ambiguous request by generating and returning a clarifying question for display in the user interface—such as asking which series is to be modified.

In an implementation, the reply from LLM service 120 is formatted according to formatting rules provided in the prompt. Application service 110 extracts a suggested modification of one or more chart properties along with suggested values of the properties from the reply according to the formatting rules. For example, the reply may present the suggested modification as a JSON data object or in semantic tags. Application service 110 extracts a chart property from the reply from LLM service 120 along with a suggested value for the chart property.

Continuing the exemplary scenario illustrated in operational environment 100, the user submits a second input in task pane 144 requesting to reduce the number of grid lines ("And there are too many grid lines"). Application service 110 generates a second prompt based on the new input and submits the prompt to LLM service 120. LLM service 120 generates a reply to the prompt which indicates a chart property to modify and the value that the chart property should be given. Upon receiving the reply to the second prompt, application service 110 generates source code based on the reply and executes the code to modify the chart, as illustrated in user experience 145.

In addition to interfacing with LLM service 120, application service 110 may execute a specific-purpose AI model, such as Microsoft Excel Insights, or other chart-related engines independent from the integration of the LLM model in the spreadsheet environment. Inquiries submitted by the user to the specific-purpose AI model may execute in parallel with the application service methods disclosed herein. For example, Insights may recommend creating the chart to a user in a spreadsheet environment. A user may use Insights to generate a chart relating to a data table (not shown) in the spreadsheet environment, where the chart is generated by Insights based on the entire data table. The user may also use a chart design engine to create the chart. In addition to and in parallel with the interaction with Insights, the user may submit an input to task pane 144 causing application service 110 to generate and send a prompt to LLM service 120 based on the input, with the prompt including context information relating to the chart or the data table.

Figure 2:
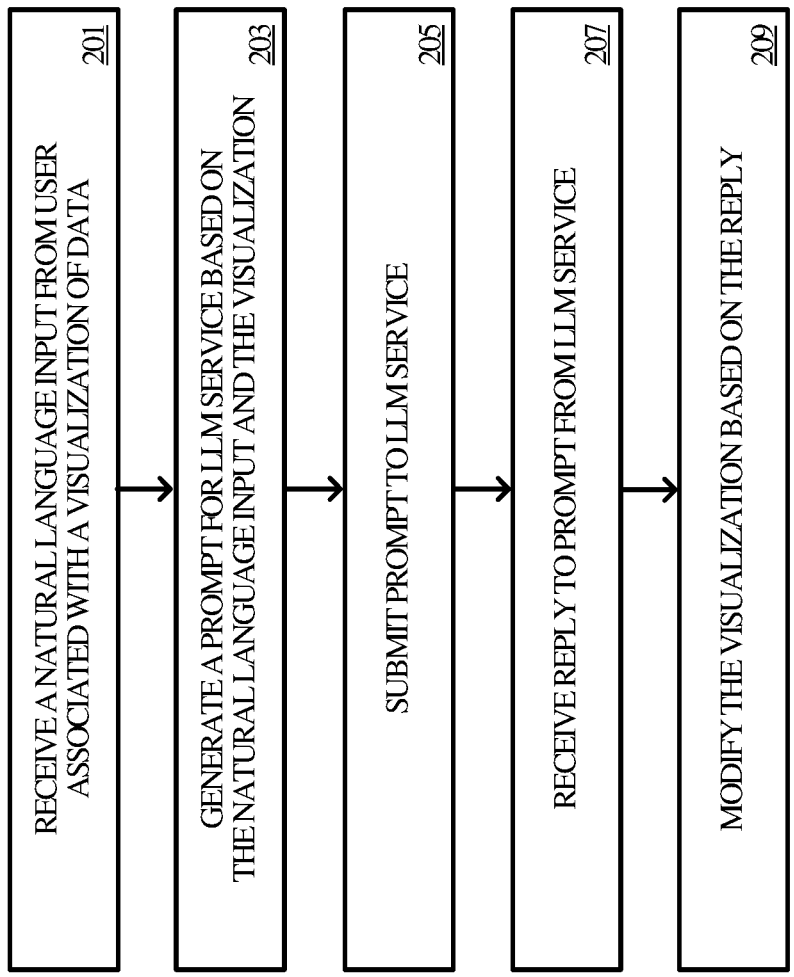
FIG. 2 illustrates a method of operating a spreadsheet application with an LLM integration in an implementation.

FIG. 2 illustrates a method of operation for an LLM integration with an application environment in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

An application service hosts an application, such as a spreadsheet application, and displays a user interface for a client application of the application service on a user computing device remote from the application service. The application service interfaces with an LLM service based on inputs received from the user. In an implementation, the application service receives a natural language input from the user associated with a chart based on tabular data, such as spreadsheet data, hosted by the application (step 201). In an implementation, the user keys in a natural language input in a task pane or chat interface in the user interface displayed on the computing device. The natural language input refers to the chart or to one or more elements of the chart, such as a design property or format property.

The application service generates a prompt for the LLM service based on the input and the chart (step 203). In an implementation, the prompt includes contextual information including a representation of the chart which includes chart properties and data relating to the spreadsheet. The prompt also includes rules which govern the manner in which the LLM is to respond to the prompt. For example, the prompt may include rules for the LLM to interpret the natural language input in the context of the spreadsheet application (that is, to recognized references to defined properties or functions of the application when indirectly referenced in the input), to classify the input according to whether the input is a chart command, a search request, etc., and to format its reply in a particular way.

To specify the format of the LLM's output, the prompt may direct the LLM service to provide its output in a parse-able format, that is, in a format which facilitates extracting the components of the output based on information type. The parse-able format can include enclosing elements of the output in tags (e.g., semantic tags such as <property> and </property>, <value> and </value>, etc.), as a JSON data object, or in another data structure. The prompt may also include a rule or instruction to generate multiple chart commands (i.e., changes to chart properties) in response to multiple modifications indicated in the input.

Having configured a prompt based on the user input, the application service submits the prompt to the LLM service (step 205). In an implementation, the application service exchanges information with the LLM service via an application programming interface (API). The application service receives a reply to the prompt from the LLM service (step 207). The reply to the prompt may include one or more commands, suggestions, recommendations, explanations, descriptions, etc., generated based on the prompt and in accordance with any rules, instructions, or parameters provided in the prompt.

Having received a reply from the LLM service, the application service modifies the chart based on the reply (step 209). In some implementations, the application service generates or translates the reply into source code. For example, the reply may recommend a new value for a chart property of the property tree of the chart. The application service translates the new value and chart property into a snippet of source code which is executable by the application service to modify the chart. In some implementations, the reply may recommend new values for multiple chart properties, each of which are translated by the application service into source code.

In some implementations, the substance of the user's input may involve a search of the application environment, a search for help, or some other type of input classification. Upon classifying the input, the reply includes other types of output, such as suggestions or recommendations which may reference other functions, operations, or engines of the application service. The application service configures the output for display in the task pane of the user interface and transmits the configured output to the user interface for display.

Referring once again to FIG. 1, operational environment 100 includes a brief example of process 200 as employed by application service 110 with respect to input received from computing device 131 and to replies received from LLM service 120.

In operational environment 100, a user at computing device 133 submits an inquiry to application service 110 which relates to a chart based on tabular data hosted by application service 110 and displayed in a client application or in a browser-based application on computing device 133. The input is provided in natural language, that is, as if the user is speaking to another person.

In user experience 143, application service 110 receives a natural language input from the user and generates a prompt to be submitted to LLM service 120 based on the input. The prompt includes contextual information, such as chart data, tabular data, or document metadata. Contextual information may also include information identifying a particular chart in a spreadsheet or other document containing multiple charts. In some scenarios, contextual information includes an external data source supplying the data on which a chart is based. Chart data includes a representation of the chart, such as JSON object array of chart properties and property values. Contextual information can also include the most recent or latest actions performed by the user on the chart. As illustrated in operational environment 100, the user has selected the data series for FY22 in the chart. Application service 110 includes in the prompt an indication of the selected data series which provides contextual information for LLM service 120 in responding to the user input.

In the prompt provided to LLM service 120, application service 110 may specify tasks to be performed by LLM service 120. Tasks in the prompt can include classifying the input according to a type, generating the reply to the input in a particular output format, and constraining the scope of the reply to methods and properties of the application service. The prompt may also task LLM service with interpreting the user's input according to the spreadsheet environment, e.g., recognizing terms in the input that likely reference a defined property or function of the spreadsheet environment. The prompt also includes one or more illustrative examples to demonstrate the format of the output.

Next, application service 110 submits the prompt to LLM service 120. LLM service 120 generates a reply to the prompt and transmits the reply to application service 110. The reply may contain multiple suggestions for accomplishing a task or action proposed in the input. Suggestions can relate to various design or formatting properties of the chart. The suggestions generated by LLM service 120 are constrained by the prompt to the domain of the spreadsheet application—in other words, the suggestions are specific to the spreadsheet application. In the exemplary scenario of operational environment 100, LLM service 120 determines the user's inputs to be commands to modify the chart design or format.

Application service 110 receives the reply to the first user input from LLM service 120 and generates a response based on the reply. Based on LLM service 120 classifying the input as a command, application service 110 generates source code to modify the color of the data series per the user's request, where the source code is based on a chart property and property value extracted from the reply. Application service 110 adds the source code to an execution queue, and when the source code is executed, the chart is modified so that the data series is colored red (as illustrated in user experience 145).

Continuing the exemplary scenario of operational environment 100, the user submits a second input in task pane 144 which indicates that the chart has "too many grid lines." Application service 110 configures a prompt including the second input and the now updated chart properties of the chart and sends the prompt to LLM service 120. Although the user's input does not express an explicit command to modify the chart, LLM service 120 classifies the second input as a command and generates one or more new chart property values to modify the chart in a way that is responsive to the user's input. For example, modifying the chart to reduce the number of gridlines may implicate multiple chart properties besides grid line properties, such as axis label properties and tick mark properties. Application service 110 generates source code to implement the changes to the property values and executes the source code to modify the chart, as illustrated in user experience 145.

In some scenarios, text-based suggestions or recommendations may be displayed by application service 110 in task pane 144 in a natural language format. The response may include suggestions generated by LLM service 120 for other actions the user may wish to implement, such as suggesting a follow-on input, viewing a preview of a suggestion, or a graphical device by which to access another functionality of application service 110.

Figure 3:
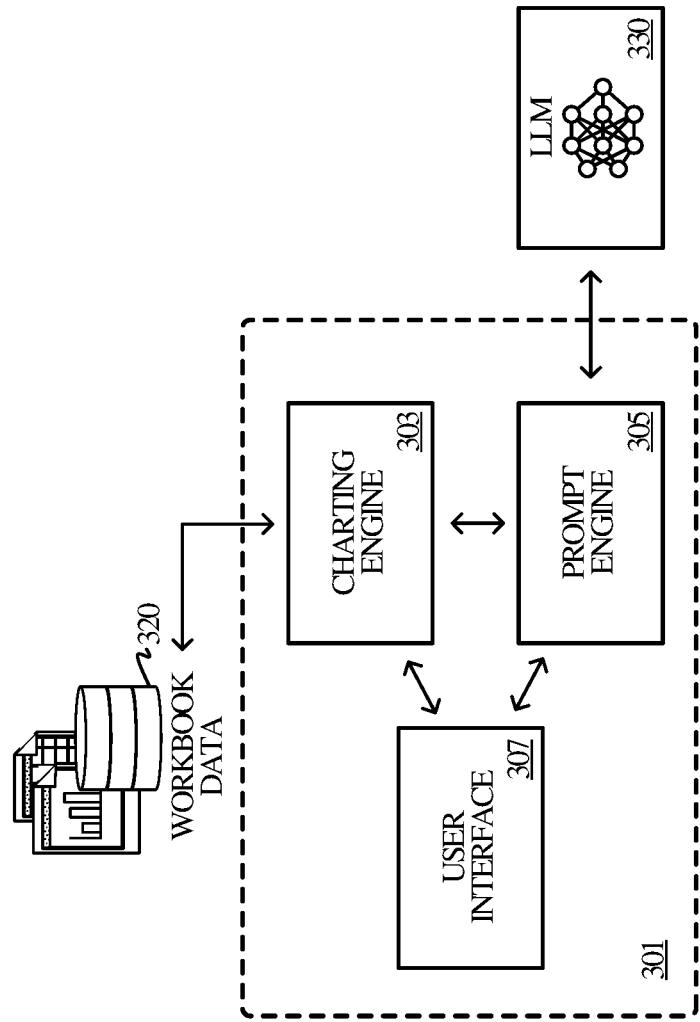
FIG. 3 illustrates a systems overview for an LLM integration in a spreadsheet environment in an implementation.

Turning now to FIG. 3, FIG. 3 illustrates system architecture 300 including application 301, workbook data 320, and LLM 330. Application 301, of which application service 110 is representative, includes charting engine 303, prompt engine 305, and user interface 307. Charting engine 303 is representative of an engine or module of an application (e.g., a spreadsheet application) which generates data visualizations based on tabular data such as spreadsheet data. Application 301 displays workbook data 320 in user interface 307 and receives user input relating to workbook data 320 from user interface 307. Workbook data 320 includes chart data, such as a property tree of a chart or other data visualization, as well as data and metadata relating to a workbook, spreadsheet, or other document which includes a chart. Workbook data 320 can include tabular data stored by the application in association with a document but can also include data received from external sources. For example, workbook data 320 can include real-time stock prices received from an online source. Prompt engine 305 of application 301 generates prompts for LLM 330 based on user input received from a user through user interface 307, e.g., in a task pane of user interface 307 and receives replies to the prompts from LLM 330.

Figure 4:
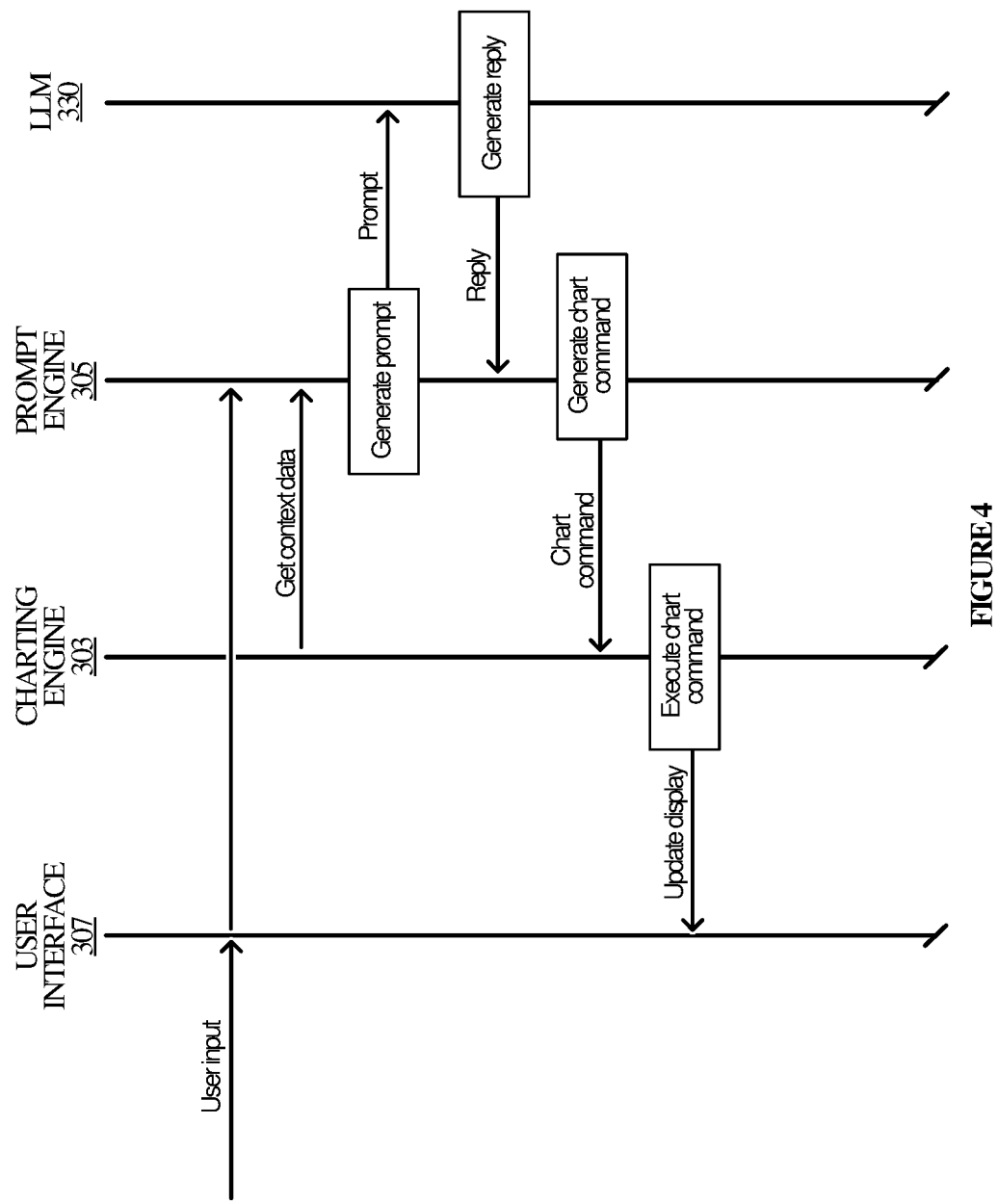
FIG. 4 illustrates an operational scenario of an LLM integration in a spreadsheet environment in an implementation.

FIG. 4 illustrates operational scenario 400 of an LLM integration with an application environment and referring to elements of FIG. 3 in an implementation. It may be appreciated that in the discussion of operational scenario 400, "chart" broadly refers to a visualization or representation of tabular data with no loss of generality. In operational scenario 400, prompt engine 305 receives a natural language input from a user via user interface 307, such as in a task pane or chat interface in user interface 307. The input may be a text entry keyed into a textbox of user interface 307 by the user or a spoken communication from the user captured by a microphone on the user computing device and which is translated to text by a speech-to-text engine. The input includes a request or query regarding a chart of workbook data 320. Prompt engine 305 configures a prompt based on the input for submission to LLM 330.

To configure the prompt, prompt engine 305 identifies a prompt template for configuring a prompt relating to a data visualization such as a chart. The prompt template includes rules which govern the manner in which LLM 330 is to respond to the prompt and illustrative examples of output formatting to guide LLM 330 in formatting its reply. Using the selected template, prompt engine 305 configures a prompt to include the user input and contextual information from workbook data 320. Contextual information included in the prompt may include a history of user inputs and replies from LLM 330 and at least a portion of workbook data 320, such as a data representation of the subject chart (e.g., property tree of the subject chart).

In an implementation, the prompt template for user input relating to charts also includes rules such as an instruction to classify the user input by type, and if the user input is classified as a command, to identify a chart property implicated by the user input and a new or updated value of the property. Tasks can also include generating suggestions or recommendations for user input classified as something other than a command, such as a search for help or a query seeking a recommendation.

Having configured a prompt, prompt engine 305 submits the prompt to LLM 330, for example, via an API of LLM 330. LLM 330 generates a reply according to the prompt and sends the reply to prompt engine 305. Prompt engine 305 generates a chart command for modifying the subject chart based on the reply from LLM 330. The chart command is executed by charting engine 303 to modify the chart. Charting engine 303 sends an updated configuration of the chart to user interface 307 for display.

Subsequent to displaying an update to the display in user interface 307, the user may provide additional natural language inputs to prompt engine 305 via user interface 307. The inputs may relate to a chart modification that was implemented via an interaction with LLM 330 or to another aspect of workbook data 320. With each new input, prompt engine 305 gathers context data from application 301 which may include aspects of the chat history or preceding LLM interaction, i.e., previous inputs, replies, suggestions, and so on.

FIGS. 5A-5E illustrate operational scenario 500 of an LLM integration for data visualization with a spreadsheet environment and referring to elements of FIG. 3 in an implementation. In operational scenario 500 of FIG. 5A, a spreadsheet application, implemented on a computing device such as a laptop computer, displays in user experience 501 spreadsheet 502 including chart 503 and task pane 504.

Figure 5A:
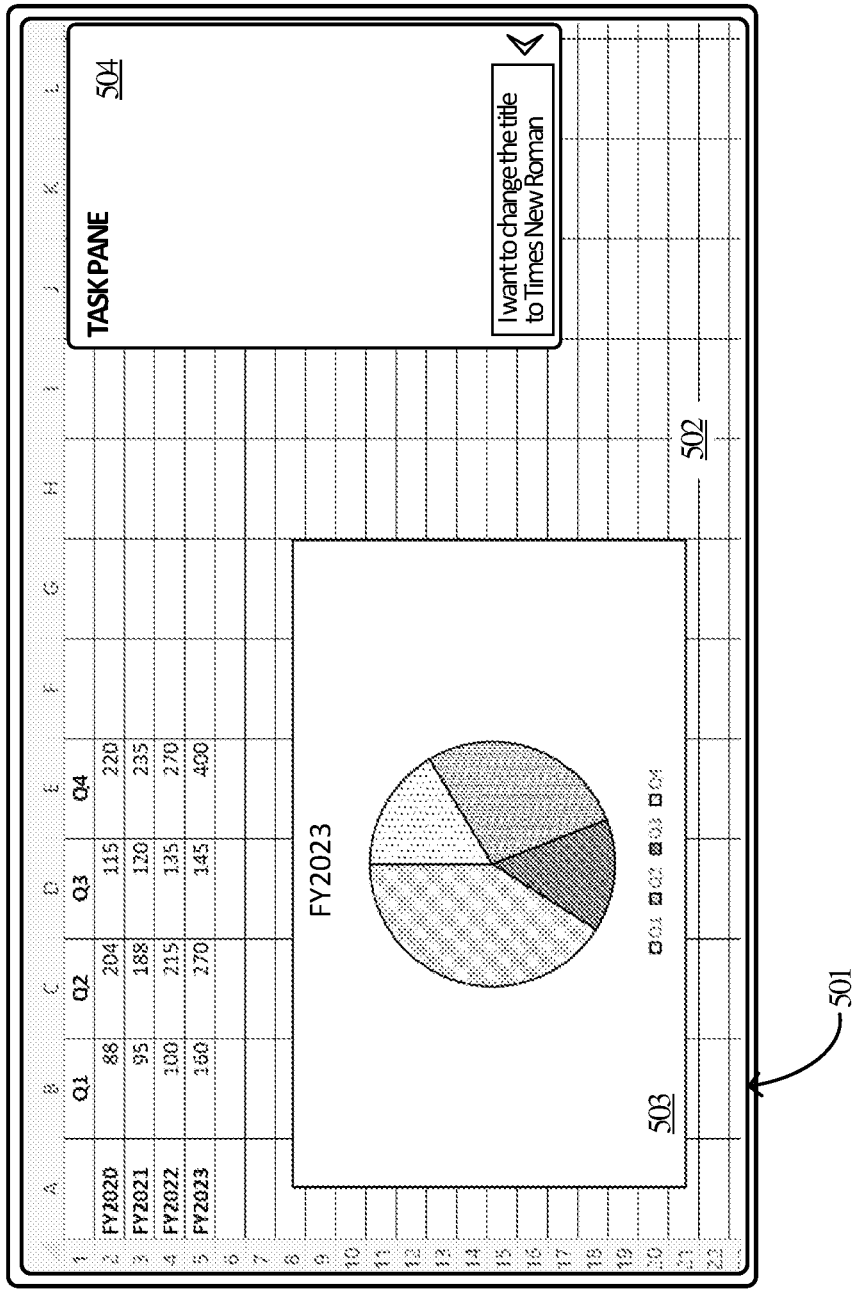
FIGS. 5A-5E illustrate an operational scenario for an LLM integration for data visualization in a spreadsheet environment in an implementation.
Figure 5B:
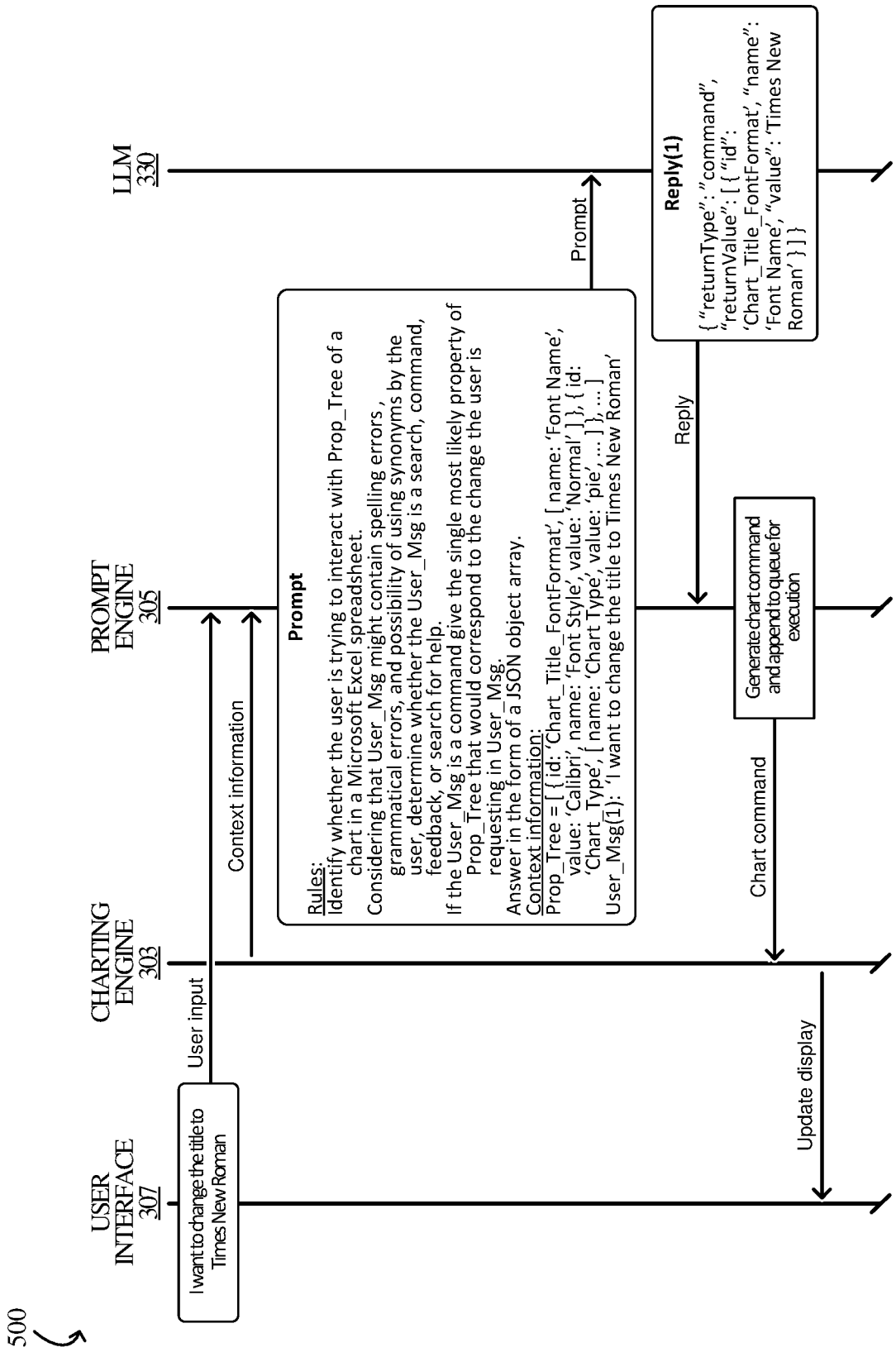
Figure 5C:
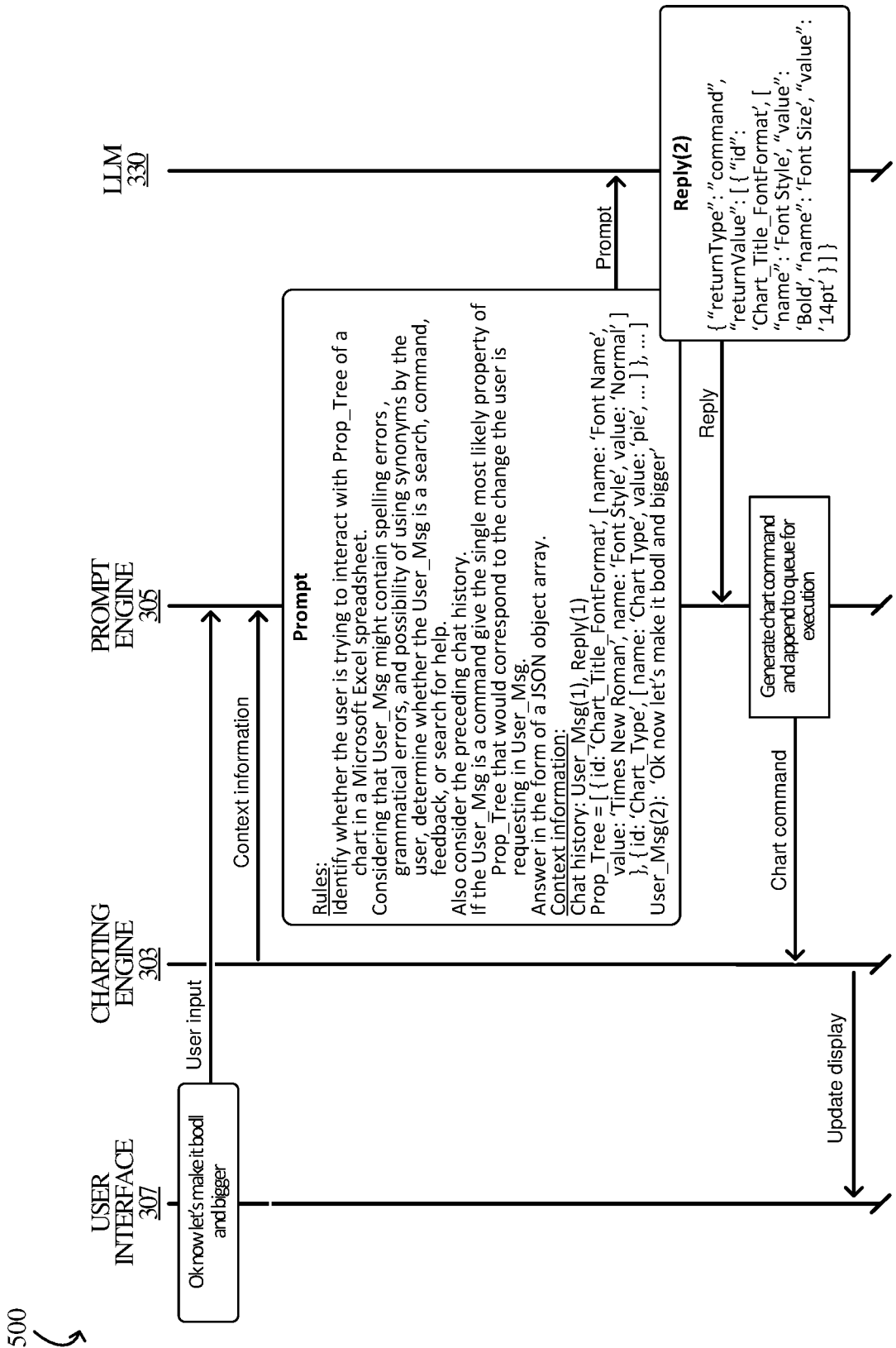
Figure 5D:
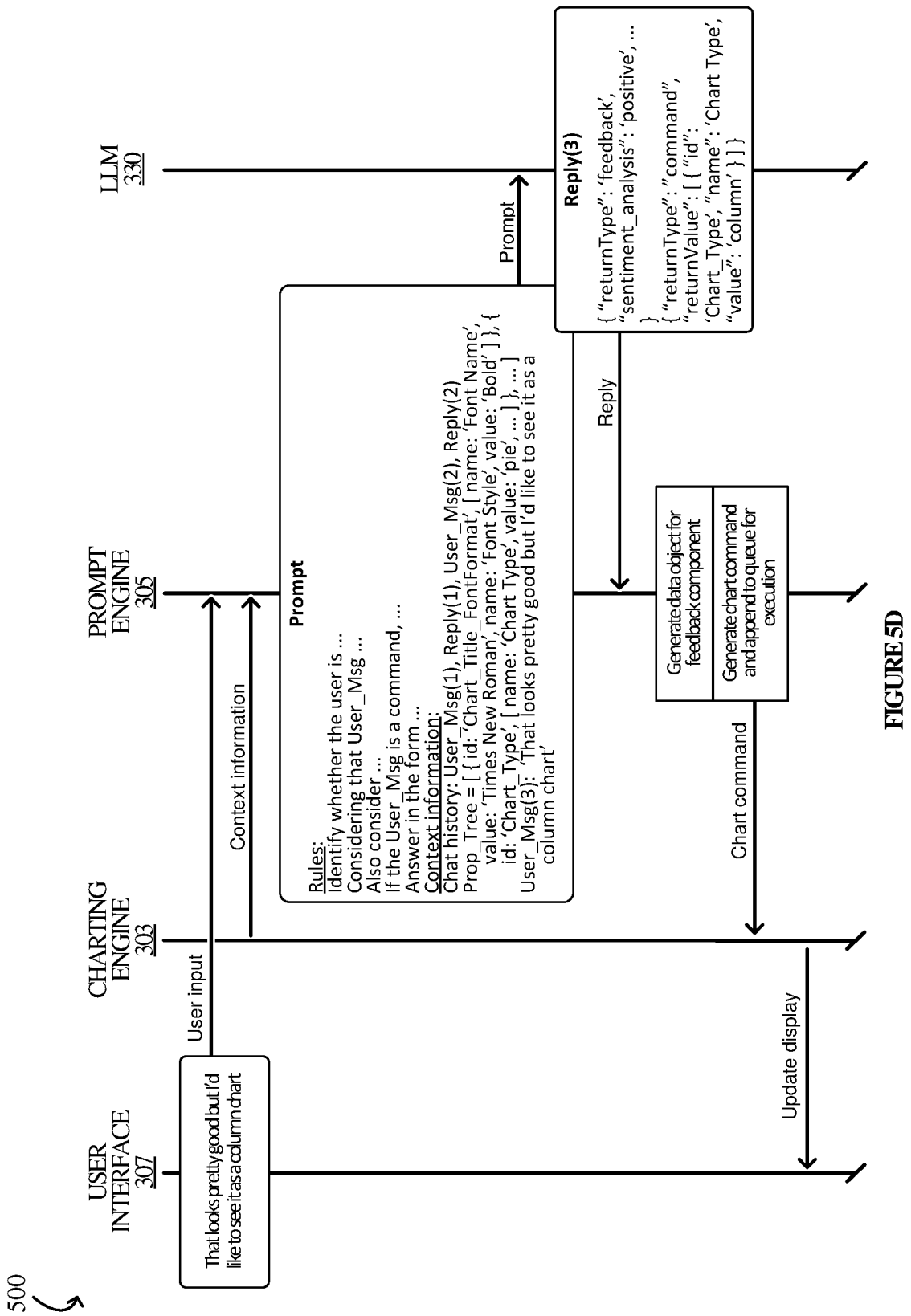

FIGS. 5B-5D continue operational scenario 500, illustrating an interaction with LLM 330 including inputs received from a user, prompts generated based on the inputs, and responses based on replies to the inputs from LLM 330. In FIG. 5B, the user enters the natural language input about chart 503 in task pane 504. User interface 307 transmits the user input to prompt engine 305 which generates a prompt based on the input. Prompt engine 305 selects a prompt template based on a type of inquiry and configures a prompt according to the template. In the prompt, prompt engine 305 includes tasks, instructions, or rules applicable to generating a reply to the input, such as tasking LLM 330 to identify whether the user is trying to interact with a representation of chart 503 ("Prop_Tree") and a rule to return the reply in a particular output format which is suitable for parsing ("JSON object array"). The tasks, instructions, and rules included in the prompt may be predetermined according to the prompt template or according to the type of inquiry. The prompt also includes the user's natural language input ("User_Msg (1)").

Prompt engine 305 also includes contextual information in the prompt, such as an indication of which chart the user input refers to, and the data representation (i.e., property tree) of chart 503. Prompt engine 305 retrieves other context data relating to data spreadsheet 502 or chart 503 from various charting engine 303 and/or other components of spreadsheet application 301. In some instances, the contextual information may include spreadsheet data such as column headers and a document file or title of the data table.

Continuing with FIG. 5B, with the prompt configured, prompt engine 305 sends the prompt to LLM 330. LLM 330 generates a reply to the prompt according to the rules presented in the prompt, including classifying the input and formatting its output as a JSON object array, and transmits the reply to prompt engine 305. Prompt engine 305 processes the reply according to the classification of the input. Because the input is classified by LLM 330 as a command ("returnType": "command"), prompt engine 305 extracts a chart property identifier ("Chart_Title_FontFormat") and property value ("Times New Roman") from the output. Prompt engine generates a chart command (e.g., executable source code) based on the property identifier and value extracted from the reply and submits the chart command or source code to application 301 to modify the chart and update the display in user interface 307.

Next, in FIG. 5C, the user submits a second input in task pane 504 relating to chart 503. Prompt engine 305 may determine that the input relates to chart 503 when the input is ambiguous based on, for example, chart 503 being selected or active in spreadsheet 502, on the user's most recent action in spreadsheet 502, or on most recent input in task pane 504. Prompt engine 305 configures a prompt according to the selected template and which includes the updated property tree for chart 503 for context.

For an ambiguous or underspecified input, the prompt template includes contextual information which LLM 330 may use to generate a reply. Here, "it" in the user input is unspecified, but because the prompt includes the immediately preceding exchange ("User_Msg (1)" and "Reply (1)"), LLM 330 generates a reply based on inferring that "it" refers to the element of chart 503 that was most recently modified (i.e., the chart title). In addition, as the rules task LLM 330 with taking into consideration that the user input may include misspellings, this allows LLM 330 to generate a reply by assuming that the user meant to enter "bold" rather than "bodl." In some scenarios, LLM 330 may identify multiple properties and values as being responsive to the user input. The prompt may include a rule for LLM 330 to determine the single most likely property and value for inclusion in its output.

Continuing operational scenario 500 in FIG. 5C, prompt engine 305 submits the prompt to LLM 330. Upon receiving the prompt, LLM 330 generates a reply which includes two suggestions or commands for modifying properties of the property tree of chart 503: "Font Style" is to be assigned the value "bold," and "Font Size" is to be assigned the value "14 pt" based on the current font size provided in "Prop_Tree." The reply is formatted according to output formatting rules provided in the prompt.

Upon receiving LLM 330's reply, prompt engine 305 post-processes the reply to generate chart commands for modifying chart 503. Post-processing the reply includes extracting information from the reply according to the output formatting rules. Prompt engine 305 generates chart commands or source code for modifying chart 503 based on the output and submits the commands to the execution queue. When the commands are executed, chart 503 is modified and the display of chart 503 is updated in user interface 307.

Continuing to FIG. 5D, user interface 307 receives a third input from the user which indicates that the user is satisfied with the latest modifications but desires to see the spreadsheet data visualized as a column chart. Prompt engine 305 configures a prompt for the input including the updated property tree of chart 503 and the most recent exchanges with LLM 330 involving chart 503 as additional contextual information for LLM 330.

In response to the prompt, LLM 330 identifies two parts of the user input and classifies the inputs according to a prompt rule specifying input classifications: search, command, feedback, and search for help. LLM 330 classifies the first part of the user input as feedback and the second part as a chart command. LLM 330 generates a reply including two response objects, one for the feedback object and one for the command object. In an implementation, for a feedback object, LLM 330 may be tasked with generating a sentiment analysis of the input as well as other content based on a rule provided for feedback objects. For the command object, LLM 330 identifies the relevant chart property (in this example, "Chart Type") and a new value for the property ("column").

Upon receiving the reply from LLM 330, prompt engine 305 generates a data object for the feedback object of the reply for further handling by application 301 and source code or a chart command for the command object. When the chart command is executed, chart 503 in user experience 501 is updated, as illustrated in FIG. 5E.

Figure 5E:
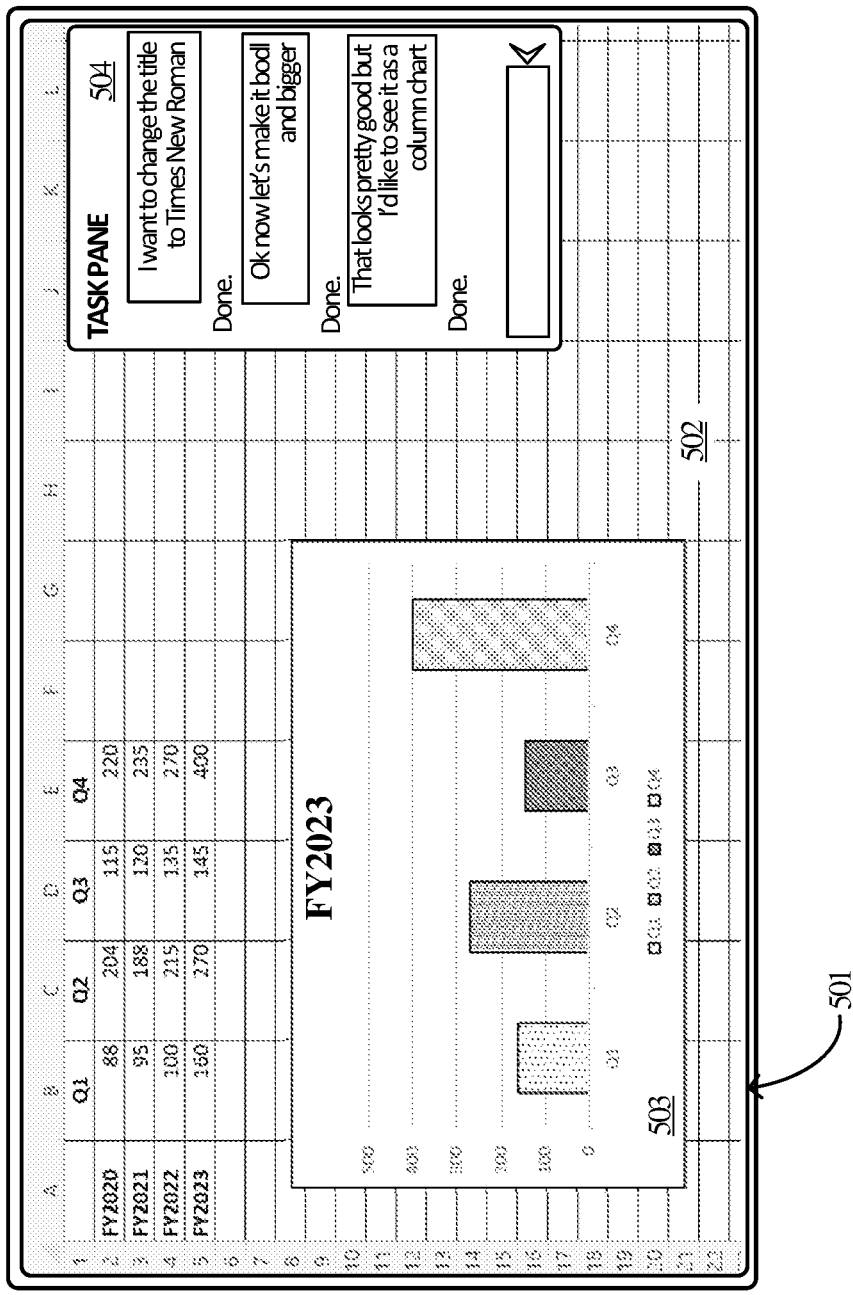

FIG. 5E illustrates spreadsheet 502 with the latest incarnation of chart 503. Task pane 504 displays the ongoing interaction between the user and the responses from LLM 330 or based on the replies from LLM 330. In some implementations, task pane 504 may provide a more detailed explanation of the action(s) taken in response to the user input, such as indicating where and how the user could manually implement the requested changes for future use. Task pane 504 may also display suggested modifications to chart 503 based on recent activity. For example, prompt engine 305 may include a task for LLM 330 in its prompts to generate suggestions for modifying the design or format of an element of chart 503 based on the user input. Task pane 504 may display a suggestion generated by LLM 330 to change the font type of other text elements of chart 503 to Times New Roman for a more consistent style.

Figure 6:
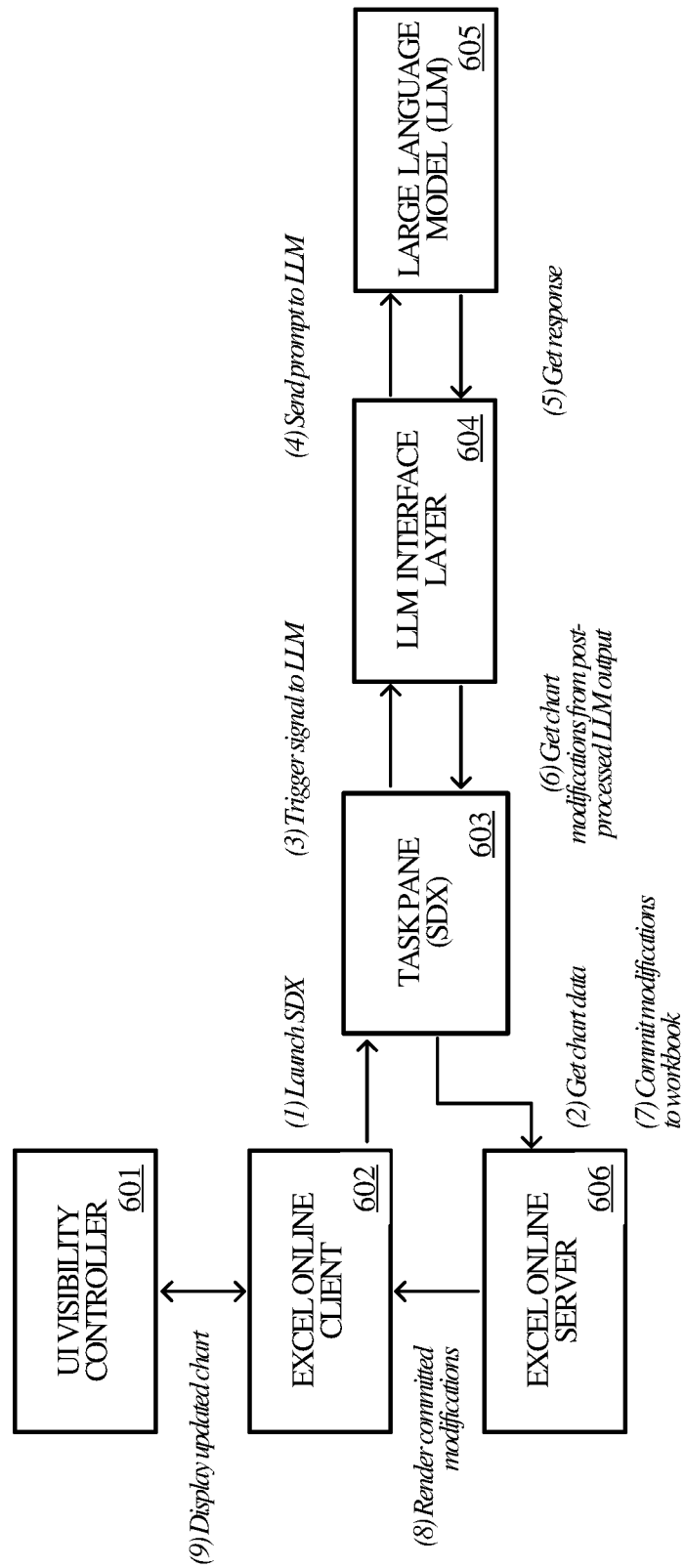
FIG. 6 illustrates an operational architecture for an LLM integration in a spreadsheet environment in an implementation.

Turning now to FIG. 6, FIG. 6 illustrates an implementation of a distributed software architecture 600 for an LLM integration for visualizations of tabular data. Software architecture 600 includes components of a Microsoft Excel application and illustrating a process by which an Excel application handles a natural language input from a user and responds to the input based on a reply to the input from an LLM. Software architecture 600 includes Excel application server 606, Excel client application 602, task pane engine 603, and user interface (UI) visibility controller 601 which controls the chart display in an implementation.

Continuing with software architecture 600, Excel client application 602 executes on a user computing device in association with Excel application server 606. Excel client application 602 displays a user interface including task pane 603 which manages interactions with LLM 605 regarding spreadsheet and chart data in the user interface. Excel client application 602 receives natural language input from a user and sends the input to task pane engine 603. Task pane engine 603 receives the natural language input from Excel client application 602 along with chart data from Excel online server 606 and sends the input to LLM interface layer 604.

LLM interface layer 604 interfaces with LLM 605 including configuring prompts for LLM 605 and configuring responses for task pane 603 based on replies from LLM 605. LLM interface layer 604 sends a prompt based on the natural language input to LLM 605. LLM 605 generates a reply to the prompt and transmits the reply to LLM interface layer 604. LLM interface layer 604 generates a response to the input based on the reply received from LLM 605. To generate a response, LLM interface layer 604 processes the output from LLM 605, such as generating source code or chart commands, based on the output for execution by task pane 603. LLM interface layer 604 sends the response (i.e., source code) to task pane engine 603 for execution. Excel online server 606 commits the modifications to the chart data, renders or delivers the committed modifications to Excel online client 602 which in turn directs UI visibility controller 601 to display the updated chart.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements data visualization process 706, which is (are) representative of the data visualization processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including data visualization process 706) may be implemented in program instructions and among other functions may, when executed by processing system 702, direct processing system 702 to operate as described with respect to the various operational scenarios, sequences, and processes illustrated herein. For example, software 705 may include program instructions for implementing a data visualization process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support a data visualization process in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer-readable storage media;
   one or more processors operatively coupled with the one or more computer-readable storage media; and
   program instructions stored on the one or more computer-readable storage media that, when executed by the one or more processors, direct the computing apparatus to at least:
   receive, in a user interface of an application, a natural language input from a user associated with a visualization of tabular data hosted by the application, wherein the visualization of the tabular data comprises a chart;
   generate a prompt for a large language model (LLM) service, wherein the prompt comprises the natural language input, properties of the chart, and instructions directing the LLM service to generate a modification of the properties based on the natural language input;
   submit the prompt to the LLM service to obtain a generated modification of the properties from the LLM service;
   receive a reply to the prompt from the LLM service, wherein the reply includes the generated modification of the properties;
   generate source code for modifying the chart based on the generated modification of the properties; and
   execute the source code to modify the properties.

2. The computing apparatus of claim 1, wherein the tabular data comprises values in a spreadsheet, and wherein the prompt tasks the LLM service with determining a classification of the natural language input and including the classification in the reply.

3. The computing apparatus of claim 2, wherein to generate the source code for modifying the chart based on the generated modification of the properties, the program instructions direct the computing apparatus to extract, from the generated modification, a modified property of the properties and a property value for the modified property when the classification of the natural language input is a command and wherein the source code comprises a chart command including the modified property and the property value for the modified property.

4. The computing apparatus of claim 3, wherein the prompt tasks the LLM service with formatting the reply as a JavaScript Object Notation (JSON) data object.

5. The computing apparatus of claim 1, wherein to generate the prompt for the LLM service, the program instructions direct the computing apparatus to include a JavaScript Object Notation (JSON) data object representation of the properties of the chart in the prompt, wherein the properties comprise property identifiers and property values.

6. The computing apparatus of claim 1, wherein the user interface comprises a task pane, wherein the task pane is configured to receive user input and to display a response based on the reply from the LLM service.

7. The computing apparatus of claim 1, wherein the application comprises a spreadsheet application.

8. The computing apparatus of claim 1, wherein the properties of the chart comprise a format of the chart, properties of the format, and a hierarchical structure of the properties of the format.

9. A method of operating an application service, a method comprising:
   receiving, in a user interface of the application service, a natural language input from a user associated with a visualization of tabular data hosted by the application service, wherein the visualization of the tabular data comprises a chart;
   generating a prompt for a large language model (LLM) service, wherein the prompt comprises the natural language input, properties of the chart, and instructions directing the LLM service to generate a modification of the properties based on the natural language input;
   submitting the prompt to the LLM service to obtain a generated modification of the properties from the LLM service;

receiving a reply to the prompt from the LLM service, wherein the reply includes the generated modification of the properties;

generating source code for modifying the chart based on the generated modification of the properties; and executing the source code to modify the properties.

10. The method of claim 9, wherein the tabular data comprises values in a spreadsheet, and wherein the prompt tasks the LLM service with determining a classification of the natural language input and including the classification in the reply.

11. The method of claim 10, wherein generating the source code for modifying the chart based on the generated modification of the properties comprises extracting, from the generated modification, a modified property of the properties and a property value for the modified property when the classification of the natural language input is a command and wherein the source code comprises a chart command including the modified property and the property value for the modified property.

12. The method of claim 11, wherein the prompt further tasks the LLM service with formatting the reply as a JavaScript Object Notation (JSON) data object.

13. The method of claim 9, wherein generating the prompt for the LLM service comprises including a JavaScript Object Notation (JSON) data object representation of the properties of the chart in the prompt, wherein the properties comprise property identifiers and property values.

14. The method of claim 9, wherein the user interface comprises a task pane, wherein the task pane is configured to receive user input and to display a response based on the reply from the LLM service.

15. The method of claim 9, wherein the natural language input comprises text expressing a request for modifying a property of the visualization.

16. The method of claim 9, wherein the prompt includes context information associated with the tabular data.

17. One or more computer readable storage media having program instructions stored thereon that, when executed by one or more processors operatively coupled with the one or more computer readable storage media, direct a computing device to:

receive, in a user interface of an application, a natural language input from a user associated with a visualization of tabular data hosted by the application, wherein the visualization of the tabular data comprises a chart;

generate a prompt for a large language model (LLM) service, wherein the prompt comprises the natural language input, and properties of the chart, and instructions directing the LLM service to generate a modification of the properties based on the natural language input;

submit the prompt to the LLM service to obtain a generated modification of the properties from the LLM service;

receive a reply to the prompt from the LLM service, wherein the reply includes the generated modification of the properties;

generate source code for modifying the chart based on the generated modification of the properties; and execute the source code to modify the properties.

18. The one or more computer readable storage media of claim 17, wherein the tabular data comprises values in a spreadsheet, and wherein the prompt tasks the LLM service with determining a classification of the natural language input and including the classification in the reply.

19. The one or more computer readable storage media of claim 18, wherein to generate the source code for modifying the chart based on the generated modification of the properties, the program instructions direct the computing device to extract, from the generated modification, a modified property of the properties and a property value for the modified property when the classification of the natural language input is a command, and wherein the source code comprises a chart command including the modified property and the property value for the modified property.

20. The one or more computer readable storage media of claim 17, wherein to generate the prompt for the LLM service, the program instructions direct the computing device to include a JavaScript Object Notation (JSON) data object representation of property identifiers and property values of the chart.

* * * * *